Sept. 22, 1953   R. V. SNYDER   2,652,858
REPAIR UNIT FOR TIRE VALVE STEMS
Filed May 21, 1949
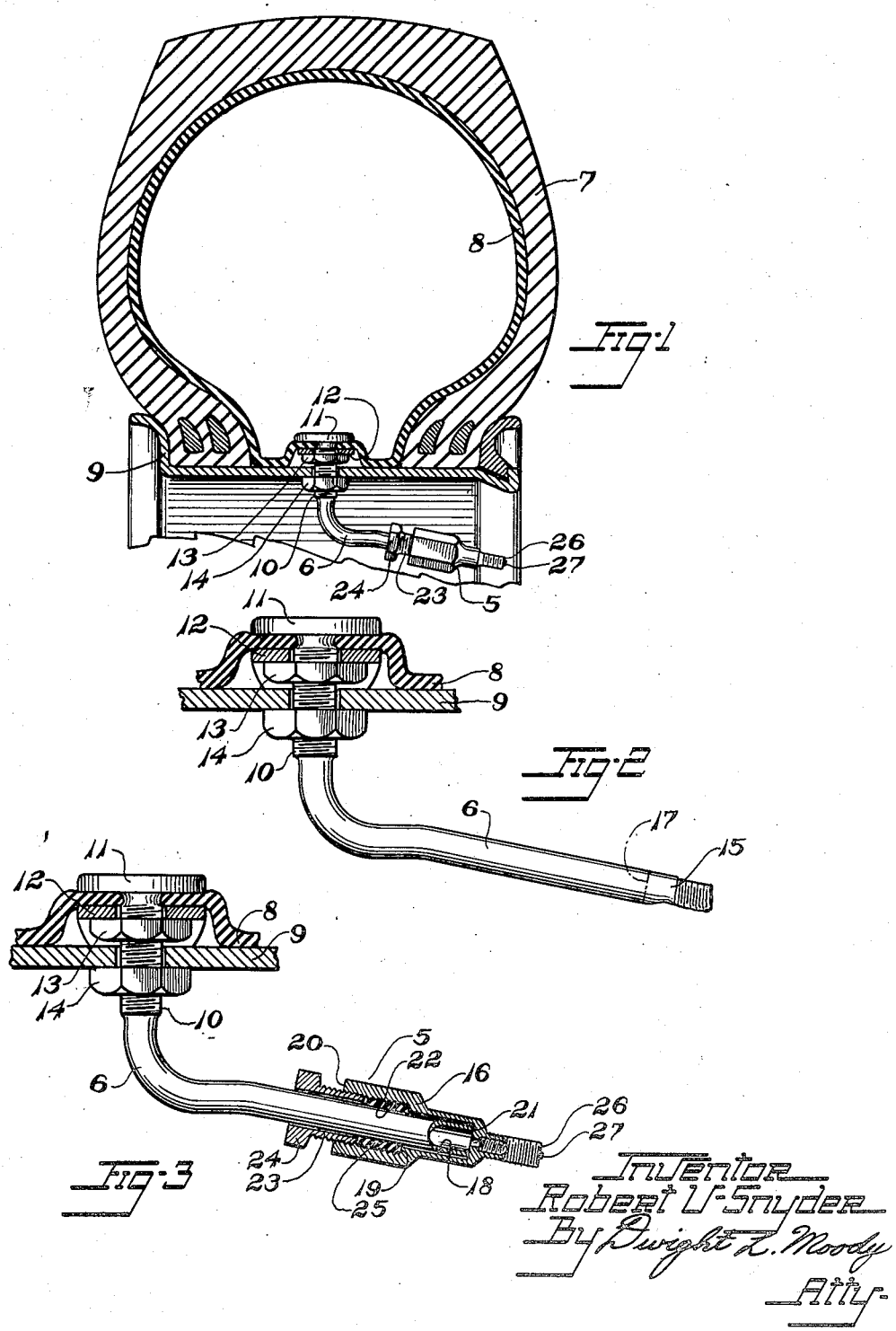

Patented Sept. 22, 1953

2,652,858

UNITED STATES PATENT OFFICE 2,652,858

REPAIR UNIT FOR TIRE VALVE STEMS

Robert V. Snyder, Cuyahoga Falls, Ohio, assignor to The B. F. Goodrich Company, New York, N. Y., a corporation of New York Application May 21, 1949, Serial No. 94,678

2 Claims. (Cl. 137—737)

1

The invention relates to tire valve stem attachments and especially to attachments for repairing damage valve stems of pneumatic tires.

Tire valve stems on trucks and other wheeled vehicles are sometimes severely damage at or adjacent the outer ends of the valve stems as by being deformed, or bent, or cracked, or even completely broken off, which conditions of damage have often required replacement of the whole valve structure. Difficulty has been experienced heretofore in making repairs in the field, especially without removal of the tire from the wheel.

Objects of the invention are to provide an attachment for tire valve stems suitable for use as an extension of the valve stem and for use as a repair unit of a damaged valve stem; to provide an attachment for repairing the valve stem without requiring removal of the tire from the wheel; to provide for maintaining an air-tight seal between the attachment and the valve stem; to provide for registering and attaching the attachment on the valve stem, especially a valve stem from which a damaged end part has been removed; and to provide simplicity of construction, convenience of application, and for effectiveness of operation.

These and other objects and advantages of the invention will be apparent from the following description.

In the accompanying drawings which form a part of this specification and in which like numerals are employed to designate like parts throughout the same, Fig. 1 is a sectional view of a pneumatic tire and wheel rim with a valve stem having an attachment applied thereto, and constructed in accordance with and embodying the invention, parts being broken away, Fig. 2 is a view like Fig. 1 but showing the tire valve stem in a damaged condition and before the application of the attachment, the broken line across the valve stem indicating the end part thereof to be removed, and Fig. 3 is a view like Fig. 2 but showing the attachment applied to the remainder of the valve stem after removal of the damaged end part.

In the illustrative embodiment of the invention shown in the drawings, an attachment or repair unit 5 is disposed on a metal valve stem 6 in detachable, sealing relation therewith for the inflation and deflation of a pneumatic tire 7 including an inner tube 8, while the same are demountably positioned on a metal wheel rim 9. Any suitable construction and arrangement of the connection of the valve stem to the inner

2 tube 8 and the wheel rim may be employed and for the construction shown, the valve stem 6 may have an externally threaded inner end portion 10 extending through suitable openings in the wheel rim 9 and the inner tube 8, and may be secured to the tube 8 by a base flange 11 positioned inside the tube and by a washer 12 and an internally threaded nut 13. The nut 13 threadedly engages the valve stem and is turned down tightly against the washer 12 to provide an air-tight union between the inner tube and the valve stem. A second internally threaded nut 14 may be threaded on the valve stem portion 10 exteriorly of the wheel rim 9 so as to hold the valve stem in the slotted opening of the rim.

The tire valve stem 6 may project laterally of the rim to the exterior side of the same where it is subject to damage, especially at the outer end portion or part 15, as shown especially in Fig. 2, which damage may be objectionable denting or other deformation of the wall of the stem, or cracking, or even breakage of the same. The invention provides an attachment or repair unit 5 which makes feasible placing the damaged valve stem in workable condition without removing the tire 7 from the wheel rim 9 and while in service in the field. The repair unit is suitable for long continued use and is compact enough to be received in close places on the wheel.

The repair unit 5 includes a hollow housing 16 of suitable metal such, for example, as brass, steel, or aluminum alloy for disposition on the remainder of the tire valve stem 6 from which the damaged end part 15 has been removed as by cutting along the broken line at 17 shown especially in Fig. 2. The housing 16 may have a stepped bore construction 18 providing in the bore an abutment or shoulder 19 spaced from the inner end at 20 of the housing, and providing an apertured partition 21 spaced-apart from the abutment 19 for registering the valve stem 6 in the housing, the stepped bore at its cylindrical portion between the abutment 19 and the apertured partition 21 being of a substantially uniform diameter to accommodate telescopically the valve stem 6 in slidable close fitting relation to the wall of the housing 16 at the cylindrical bore portion, as shown especially in Fig. 3, to avoid lateral looseness of the valve stem in the housing 16. The wall of the housing between the end at 20 and the abutment 19 may have a hexagonal exterior shape as shown especially in Fig. 1, for manipulation and has desirably interior threads 22 for engagement with an exteriorly threaded hollow plug 23 having a hexagon head 24, the plug 23 being positionable on the valve stem and insertable in the bore 18 from the end at 20 of the housing. A combined sealing and gripping member 25 of resilient rubber, natural or synthetic, or other rubber-like material, is disposed in the bore 18 and preferably elongated in the axial direction so as to provide extensive surface for engaging the wall of the housing and the valve stem in air-tight relation therewith under pressure exerted by the plug 23 on the member 25 for the assembled relationship of the valve stem and the repair unit.

The housing 16 at its outer end has desirably an outwardly projecting tubular end portion or cylindrical nipple 26 having preferably a substantially uniform outside diameter approximately equal to but not exceeding the diameter of the bore 18 at said cylindrical zone thereof as shown especially in Fig. 3, which nipple 26 may be interiorly and exteriorly threaded for engagement with a valve core 27 and closure cap (not shown) therefor of suitable construction for admitting inflating air to the valve stem. Thus, the repair unit provides a combined gripping and inflating structure which inflates directly through the housing and the valve stem.

In the use of the repair unit 5 comprising the plug 23 and the housing 16 including the member 25 and valve 27, the repair unit 5 is slipped plug first over the end of the remainder of the valve stem 6 from which the damaged end part 15 has been cut-off or otherwise suitably removed, until the valve stem is seated at its end against the partition 21. The plug 23 is then turned sufficiently to exert axial pressure upon the sealing and gripping member 25 so that the latter is compressed a substantial extent thereby radially expanding the rubber material of the same against the wall of the housing and the valve stem, as shown especially in Fig. 3, to provide an air-tight seal and at the same time, to provide for elastically gripping and securely holding the repair unit 5 on the valve stem 6. Inflating air from a suitable source of supply is then admitted through the valve 27 to the valve stem, whereby the tire 7 is inflated to the desired pressure, escape of air about the valve stem being prevented by the sealing action of the member 25 in its compressed condition.

Such repair of the valve stem is advantageously and conveniently effected without removal of the tire from the wheel rim and makes feasible extensive additional use of the tire assembly. The repair unit is compact enough to be received in close places on the wheel. When desired, the repair unit may be utilized as an extension of an undamaged valve stem. If the damage at the end at 15 of the valve stem is of minor character yet sufficient to prevent operation of the valve core 27, the core may be removed and the repair unit 5 may be applied without cutting off the damaged end part.

Variations may be made without departing from the scope of the invention as it is defined in the following claims.

I claim:

1. A tire valve stem attachment for mounting telescopically on the end of a valve stem, while the latter is on a mounted tire, for extension or repair of the valve stem, said attachment comprising a hollow housing having therein a cylindrical bore of a diameter to receive telescopically an end portion of a valve stem in slidable close fitting relation to the housing, a counterbore forming a mouth at one end of the housing for surrounding said end portion of the valve stem, said housing having a threaded portion at said one end thereof, an internal annular abutment at the junction of said bore and said counterbore, and an apertured partition across the end of said cylindrical bore remote from said mouth for abutting the end of the valve stem, and said housing including a tubular nipple for receiving and engaging an inflating valve core, said nipple projecting outwardly away from said partition in communication with said cylindrical bore through the aperture in said partition and said nipple at least at its outer end portion having a substantially uniform outside diameter approximately equal to but not exceeding the diameter of said cylindrical bore for facilitating telescopically and separably engaging the nipple with a closure cap, a tubular sealing body formed in its entirety of resilient rubber-like material and disposed in said counterbore for encircling the valve stem and having an end face seating against said abutment, a threaded hollow plug extending into said counterbore for encircling the valve stem and having a threaded engagement with said threaded portion of the housing, said plug presenting a shoulder seating against the other end face of said tubular sealing body so as to distort and press said body in air-tight relation against said abutment and said shoulder and the internal wall of said housing along said counterbore and also in air-tight elastically gripping relation against the valve stem, while maintaining the normal shape of the valve stem, when said plug is tightened with said attachment slidably mounted on the valve stem in telescopic relation thereto.

2. A tire valve stem attachment for mounting telescopically on the end of a valve stem, while the latter is on a mounted tire, for extension or repair of the valve stem, said attachment comprising an elongate hollow housing having therein a cylindrical bore of a diameter to receive an end portion of a valve stem in slidable close fitting relation to the housing, a counterbore forming a mouth at one end of the housing for surrounding said end portion of the valve stem, said housing having an internally threaded portion at said one end thereof and a polygonal outer surface extending about said counterbore, an internal annular abutment at the junction of said bore and said counterbore, and an apertured partition across the end of said cylindrical bore remote from said mouth for abutting the end of the valve stem, and said housing including an internally threaded tubular nipple for receiving and threadedly engaging an inflating valve core, said nipple projecting axially outward away from said partition in communication with said cylindrical bore through the aperture in said partition and said nipple having external threads and a substantially uniform outside diameter approximately equal to but not exceeding the diameter of said cylindrical bore for facilitating telescopic and threaded engagement of the nipple with an internally threaded closure cap, a tubular sealing body formed in its entirety of resilient rubber-like material and disposed in said counterbore for encircling the valve stem and having an end face seating against said abutment, an externally threaded tubular plug having a flange at its outer end and extending into said counterbore for encircling the valve stem and having threaded engagement with said internally threaded portion of the housing, said plug presenting at its inner end a shoulder seating against the other end face of said tubular sealing body so as to distort and press said body in air-tight relation against said abutment and said shoulder and the internal wall of said housing along said counterbore and also in air-tight elastically gripping relation against the valve stem, while maintaining the normal shape of the valve stem, when said plug is tightened with said attachment slidably mounted on the valve stem in telescopic relation thereto.

ROBERT V. SNYDER.

References Cited in the file of this patent

UNITED STATES PATENTS

| Number | Name | Date |
| --- | --- | --- |
| 744,123 | Spietschka | Nov. 17, 1903 |
| 1,025,354 | Williams | May 7, 1912 |
| 1,341,828 | Volckhausen | June 1, 1920 |
| 1,670,219 | Smith | May 15, 1928 |
| 1,896,708 | Jones | Feb. 7, 1933 |
| 2,015,592 | Crowley | Sept. 24, 1935 |
| 2,385,156 | Newell | Sept. 18, 1945 |
| 2,499,024 | Hollyday, Jr. | Feb. 28, 1950 |